United States Patent [19]
Ordoyne et al.

[11] Patent Number: 6,012,753
[45] Date of Patent: Jan. 11, 2000

[54] PET BARRIER FOR INSTALLATION IN A VEHICLE WITH REMOVABLE HEADRESTS

[76] Inventors: William K. Ordoyne, 840 Huckleberry La.; Nash A. Martinez, 3349 Jason La., both of Gretna, La. 70056

[21] Appl. No.: 09/225,110

[22] Filed: Jan. 4, 1999

[51] Int. Cl.[7] .............................. B60P 3/04; A01K 1/02; B60R 27/00
[52] U.S. Cl. ..................... 296/24.2; 296/24.1; 119/496; 297/391
[58] Field of Search ................................. 296/24.2, 24.1, 296/37.16; 119/496, 510, 516, 519, 523; 297/391

[56] References Cited

U.S. PATENT DOCUMENTS

| | | |
|---|---|---|
| D. 326,076 | 5/1992 | Wiese . |
| D. 393,622 | 4/1998 | Goertzen . |
| 2,982,579 | 5/1961 | Greenwald .............................. 296/24.1 |
| 3,534,998 | 10/1970 | Johnson et al. ......................... 296/24.1 |
| 4,546,728 | 10/1985 | May ........................................ 119/496 |
| 4,854,364 | 8/1989 | Junker . |
| 5,165,754 | 11/1992 | Louys . |
| 5,768,826 | 6/1998 | Wilcher et al. . |
| 5,768,827 | 6/1998 | Hackett . |

FOREIGN PATENT DOCUMENTS 2206548  1/1989  United Kingdom .................. 296/24.1

Primary Examiner—D. Glenn Dayoan
Assistant Examiner—Patricia Engle
Attorney, Agent, or Firm—George E. Stanford, Jr.

[57] ABSTRACT

A portable pet barrier for temporary installation in an automotive vehicle, the vehicle having seating arrangements which feature removable headrests. The barrier is intended to restrict the movement of medium to large sized pets, for example, dogs, to portions of the vehicle not occupied by the driver or passengers. Typically, the barrier is installed across the backrest of the rear seating of a sport utility vehicle (SUV), minivan, or station wagon to confine the pet to the rear luggage/cargo portion of the vehicle. Without using tools or making threaded adjustments, installation of the barrier entails the engagement of two or more slidable bolts with coaxially aligned headrest sockets, the sockets becoming available for use after removal of the headrests. Inserted into headrest sockets and frictionally in contact with the resilient, compliant obstructive panel of the barrier, the bolts fasten and maintain position of the barrier across the top of the vehicle backrest.

15 Claims, 3 Drawing Sheets

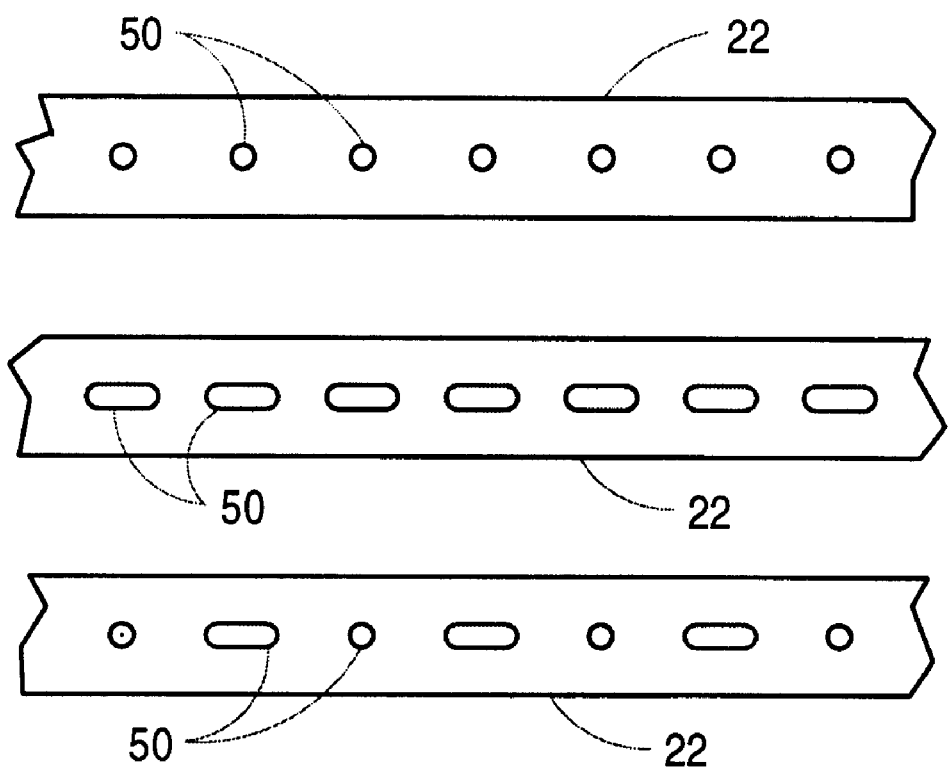

6,012,753

PET BARRIER FOR INSTALLATION IN A VEHICLE WITH REMOVABLE HEADRESTS

BACKGROUND

1. Field of the Invention

The present invention concerns generally a pet barrier for installation in a vehicle. In particular, the present invention is directed to a pet barrier for automotive vehicles, wherein such vehicles include seating arrangements having backrests with removable headrests. For example, the present invention provides a portable barrier for the temporary containment of pets in the luggage/cargo portion of station wagons, vans, sport utility vehicles (SUV), and like enclosed vehicles, which have rear seat headrest assemblies included in a seating arrangement and where the headrests are readily removable therefrom. The installed barrier prevents the contained pet from climbing, leaping, or otherwise moving forward from the luggage/cargo portion and into the seating portions of the vehicle, which may be occupied by a driver or passengers.

2. Description of Related Art

Often there is a reoccurring need to transport medium to large pets, such as dogs, in an automotive vehicle, either the pet owner's vehicle or a vehicle owned by someone else. This need presents a continuing problem confronting these pet owners as to a simple, effective method for temporarily containing or restricting the pets during transportation, without having the pet either disrupt the driver and passengers or soil or damage the seating portions of the vehicle.

In many situations, cages and restraining straps are unsuitable due to space limitations in the vehicle, expense of a cage, or time and effort required to install and remove the cage or restraining straps. Some examples of non-cage, non-strap solutions to the problem are a portable barrier to prevent the pet from exiting the vehicle through an open window and an adjustable barrier mounted from floor to ceiling, extending transversely across the width of the vehicle. The examples entail adjustment of tubular structural members to form the pet barrier. U.S. Pat. No. 4,854,364 "PET BARRIER FOR CAR WINDOW INSTALLATION", U.S. Pat. No. D 326,076 "ANIMAL BARRIER FOR VEHICLES", and U.S. Pat. No. D 393,622 "VEHICLE SAFETY BARRIER FOR PETS" are incorporated herein by reference respectively for purposes of indicating the background of the present invention or illustrating the mature state of the art for constraining pets in vehicles without the use of cages or restraining straps.

A need exists for a simple, portable barrier that will restrict medium to large size pets to a particular portion of a vehicle, generally the rearmost portion of the vehicle.

SUMMARY

An object of the present invention is to provide a restrictive panel for installation across the top of a seating arrangement of a vehicle, for preventing a pet from moving across the top of the seating arrangement from an initial desired placement of the pet to a subsequent undesired location within the vehicle, wherein the seating arrangement features removable headrests and the panel is attached to the seating arrangement by utilizing the headrest sockets remaining in the seating arrangement after the headrests have been removed. Another object of the invention is to provide a pet barrier for installation in headrest sockets, for restricting the movement of a pet to a certain portion of a specialty vehicle, particularly the luggage/cargo portion of a SUV, van, or station wagon that has removable headrests for ready installation of the barrier. A further object of the invention is to minimize adjustments necessary to install and utilize the pet barrier. Another object of the invention is low cost and portability of the pet barrier.

BRIEF DESCRIPTION OF THE DRAWINGS

FIG. 7 is an enlarged, partial view of the top longitudinal structural member, demonstrating some of the various compliant engagement guide aperture shapes and patterns that could be employed, uniformly spaced round, uniformly spaced slot, and a combination of uniformly spaced round and slot.

DESCRIPTION OF THE PREFERRED EMBODIMENT

Figure 1:
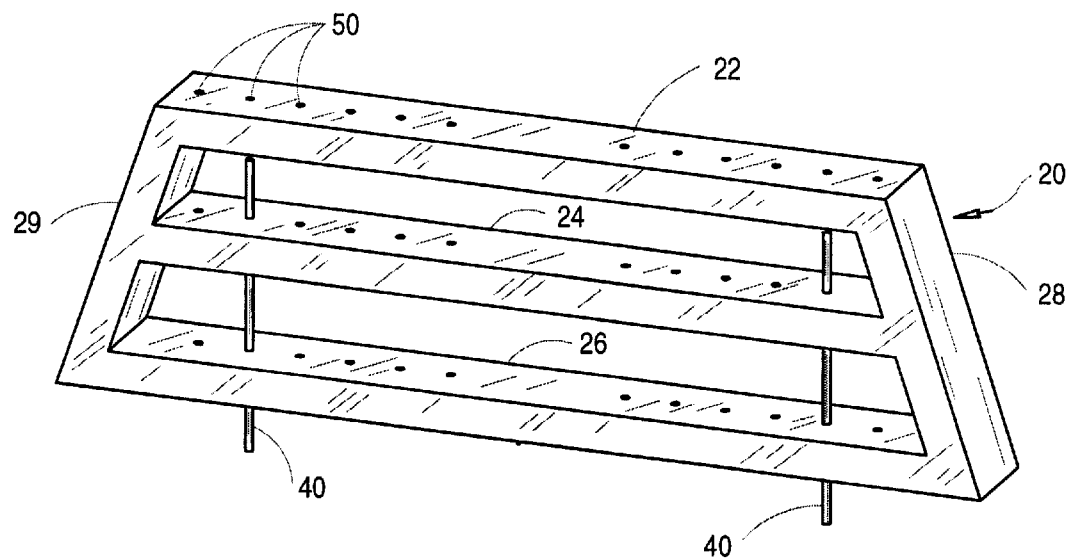
FIG. 1 is a perspective view of an embodiment of a pet barrier according to the present invention for installation in a vehicle having removable headrests. In this figure, the panel forming the barrier is a trapezoid grating having three horizontal, longitudinal structural members and two transverse structural members. Two engagement bolts are also shown. The engagement guides, formed in all three longitudinal members, have round apertures.

In a perspective view, FIG. 1 depicts a portable pet barrier according to the present invention. The barrier includes an obstructive panel 20 that has a plurality of horizontal, longitudinal structural members, including a top longitudinal structural member 22, a middle longitudinal structural member 24, and a bottom longitudinal structural member 26. Panel 20 also has a right transverse structural member 28 connected to the right end of each of the plurality of longitudinal structural members and a left transverse structural member 29 connected to the left end of each of the plurality of longitudinal structural members. To maximize the barrier effectiveness of the panel 20 by conforming to the greatest extent possible to the interior contour of the vehicle, top member 22 may be shorter than middle member 24, and middle member 24 may be shorter than bottom member 26. In the preferred embodiment, the longitudinal and transverse structural members are configured to form a trapezoidal grating.

In the preferred embodiment of the present invention, panel 20 is formed from a single molding or casting of a resilient, compliant plastic material, such as polyurethane or polyvinyl chloride (PVC) used with a suitable plasticizer; however, other plastic materials, such as polyethylene, polystyrene, polycarbonate, or like plastic materials can also be used. The material used to fabricate Panel 20 may feature optical properties extending from transparent to opaque. Panel 20 could alternatively be constructed or formed from separate plastic or metal pieces. Panel 20 can be molded to fit specific vehicles or molded in several sizes to approximately fit those vehicles.

In special situations where the pet could be potentially dangerous to other occupants of the vehicle, panel 20 could be fabricated from a single sheet of optically transmissive high impact polycarbonates or bulletproof glass. In this special case, one or more holes could be formed in the sheet to provide adequate ventilation between different portions of the vehicle.

Panel 20 is attached to the vehicle by a plurality of slidable engagement bolts 40. The slidable engagement bolts 40, fabricated from either metal or plastic, are held in placement for engaging the headrest sockets 61 by a plurality of compliant engagement guides 50. Although the guides 50 could be drilled or otherwise formed after molding the panel 20, the engagement guides 50 preferably are molded in all longitudinal structural members, each individual guide molded coaxially in all of the longitudinal structural members. In the preferred embodiment, panel 20 is molded from a compliant plastic material such that although the engagement bolts 40 are in direct contact with compliant engagement guides 50, the compliant properties of panel 20 and associated guides 50 permit the bolts 40 to be manipulated by hand. As illustrated in FIG. 7, the apertures of the engagement guides 50 may be round, slot, or a combination of round and slot, serving to properly align engagement bolts 40 with respective headrest sockets 61 available when the headrests have been removed.

Figure 2:
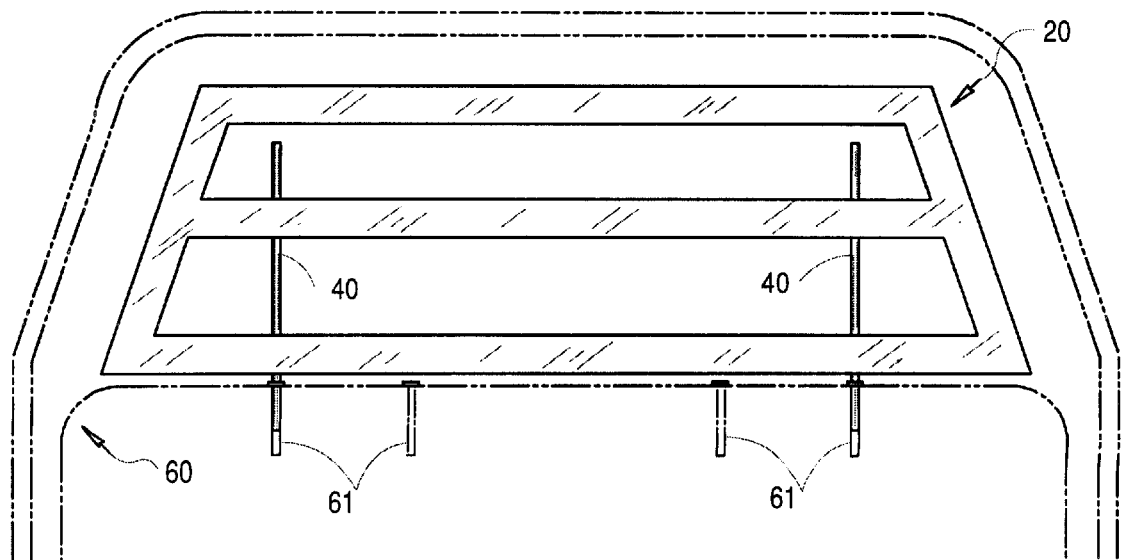
FIG. 2 is a rear view of an embodiment of a pet barrier according to the present invention for installation in a vehicle having removable headrests, depicted in position of use in such a vehicle. Both the outer shell of the vehicle and the seating arrangement containing the receiving sockets for the headrests are shown in phantom lines for illustrative purposes only and neither form any part of the claimed invention. Portions of the headrest receiving sockets, although not part of the claimed invention, are shown as solid or hidden lines, depending upon their visibility to an occupant of the vehicles, to demonstrate their significance to the invention.

A typical installation of the present invention in a vehicle is illustrated in FIG. 2 where panel 20 is attached to the vehicle seating arrangement 60 (not claimed in the present invention) of a vehicle. This seating arrangement is typically the rear seating arrangement of a van, sport utility vehicle (SUV), or station wagon, where the seating separates the luggage/cargo area from the passenger area. Seating arrangement 60 includes a plurality of vehicle headrest guides 61 (not claimed in the present invention), which remain after the headrests have been removed. The headrest guides normally position and maintain the headrests.

Installation of the present invention in a vehicle is simple. First, the headrests are removed from vehicle seating arrangement 60, leaving two or more vehicle headrest sockets 61 remaining at the top of the seating arrangement, i.e. the top of the backrest. Second, the obstructive panel 20 is positioned vertically over the headrest sockets 61 and positioned so that at least two of the headrest sockets 61 are aligned with at least two of the engagement guides 50. Next, the panel 20 is rotated approximately 90 degrees to a horizontal position and at least two slidable engagement bolts 40 are inserted completely into the engagement guides 50 in alignment with headrest sockets 61. The bolts 40 pass through bottom longitudinal structure member 26 and middle longitudinal structure member 24 and into top longitudinal structure member 22. The engagement bolts 50 are now totally retracted within panel 20 and held in place by compliant friction. Next, while maintaining alignment, panel 20 is rotated back to a vertical position. Finally, with panel 20 held in vertical position, the engagement bolts 50 are urged by hand manipulation to extend into and engage the headrest sockets 61, thereby attaching the portable pet barrier to the top of the seating arrangement.

To remove the portable pet barrier from the vehicle, the order of steps is reversed and the two headrests replaced in their customary position.

Figure 3:
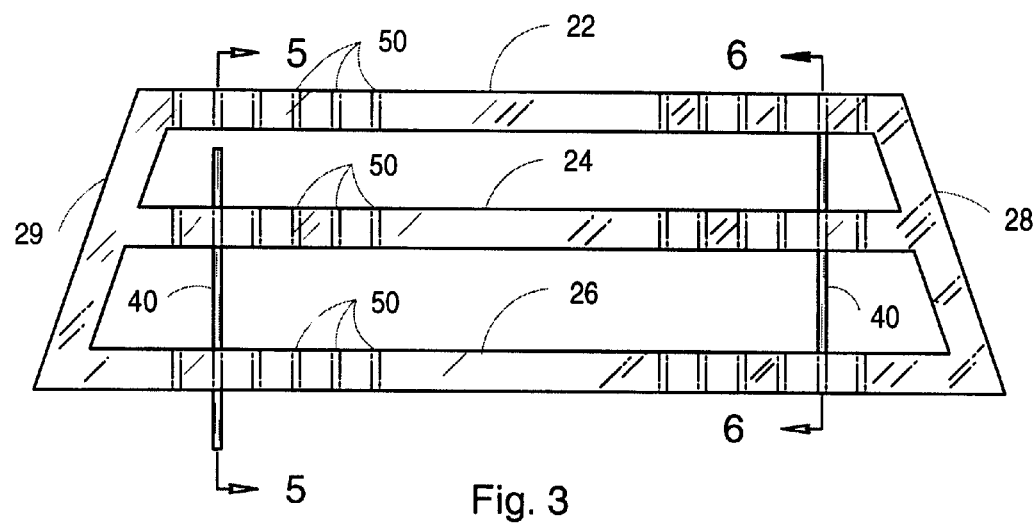
FIG. 3 is a front elevation view of an embodiment of the present invention, showing one of the slidable, engagement bolts lowered for engagement with a headrest socket, a second slidable, engagement bolt retracted for ease in removal of the pet barrier from the vehicle. The pet barrier engagement guides are shown as hidden lines.

FIG. 3 shows the pet barrier with obstruction panel 20 receiving two engagement bolts 40. One of the bolts is extended for engagement with a headrest socket; the other bolt is shown retracted for removal of the portable pet barrier from the vehicle. A plurality of engagement guides 50 are provided for aligning the bolts 40 with at least two of the headrest sockets. FIG. 3 also includes sectional view 5—5 and sectional view 6—6.

Figure 4:
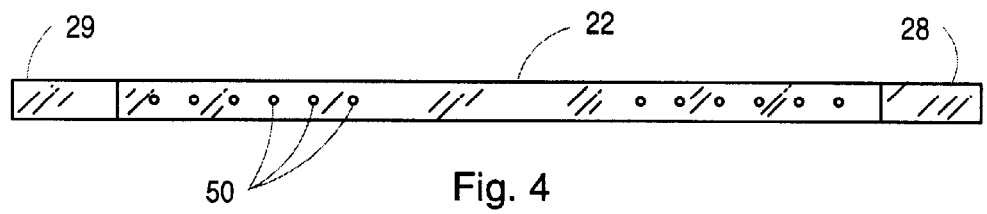
FIG. 4 is a top plan view of an embodiment of the present invention, showing the barrier engagement guides, featuring a round aperture, as they appear in the top longitudinal structure member.

FIG. 4 is a top view of the pet barrier showing top longitudinal structural member 22, right transverse structural member 28, left transverse structural member 29, and the plurality of engagement guides 50. The guides 50 are uniformly spaced with respect to each other and may be round, slot, or a combination of round and slot to insure that at least two of the headrest sockets are in alignment with any two of the engagement guides.

The present invention is primarily intended for use in vehicles whose headrests are removable and where each of the headrests is attached to a seat by use of two round headrest sockets.

Figure 5:
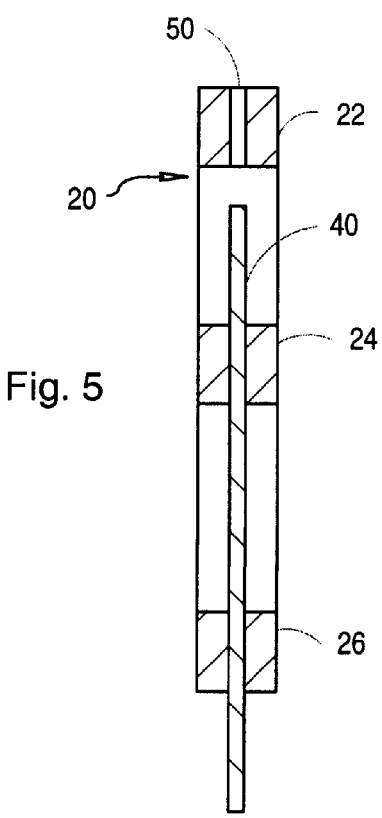
FIG. 5 is an enlarged sectional view of an embodiment of the present invention, illustrating a slidable engagement bolt in extended position for engaging a headrest socket and thereby affixing the invention to the vehicle.
Figure 6:
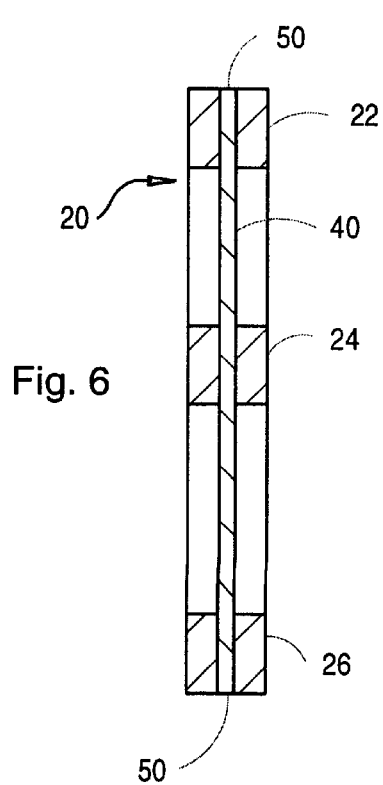
FIG. 6 is an enlarged sectional view of an embodiment of the present invention, illustrating a slidable engagement bolt in retracted position for detaching the invention from a headrest socket, permitting removal of the invention from the vehicle.

FIG. 5, an enlarged view of section 5—5, depicts one of the engagement bolts 40 extended to engage a headrest socket. FIG. 6, an enlarged view of section 6—6, shows another of the engagement bolts 40, withdrawn within the body of panel 20, permitting easy removable of the pet barrier from the headrest socket incorporated in the seating arrangement of the vehicle.

Although only a few exemplary embodiments of the invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-functions clauses are intended to cover the structures described herein as performing the recited functions and not only structural equivalents but also equivalent structures.

What is claimed is:

1. A portable pet barrier for installation in an automotive vehicle having a seating arrangement including removable headrests, the barrier comprising:

a panel formed as a grating from a material selected from a group consisting of polycarbonates, plexiglass, and plastics, said panel, mounted atop the seating arrangement, forming a barrier for preventing a pet initially placed in a desired, first location of the vehicle from subsequently entering a prohibited, second location of the vehicle by moving over and across the top of the seating arrangement, wherein the seating arrangement has a plurality of headrest assemblies, each assembly including a removable headrest and at least one headrest socket remaining in the seating arrangement after removal of the headrest;

means for engaging and affixing said panel atop the seating arrangement, engaging said panel with at least two headrest sockets remaining after removal of the headrests; and means connected to said panel for guiding, aligning and positioning said means for engaging and affixing coaxially with at least two headrest sockets, for positioning said panel vertically atop the seating arrangement.

2. A portable pet barrier for installation in an automotive vehicle having a seating arrangement including removable headrests, the barrier comprising:

a panel forming a barrier for preventing a pet initially placed in a desired, first location of the vehicle from subsequently entering a prohibited, second location of the vehicle by moving over and across the top of the seating arrangement, wherein the seating arrangement has a plurality of headrest assemblies, each assembly including a removable headrest and at least one headrest socket remaining in the seating arrangement after removal of the headrest;

a plurality of slidable, engagement bolts for frictional engagement with said panel and vehicle headrest sockets for affixing said panel atop the backrest of a seating arrangement having at least two removable headrests, for providing a pet barrier in an automobile; and means connected to said panel for guiding, aligning and positioning said engagement bolts for engagement with at least two headrest sockets remaining after headrests have been removed, for positioning said panel vertically atop the seating arrangement.

3. A pet barrier as recited in claim 2, wherein said panel is a trapezoidal grating formed from a plurality of horizontal longitudinal members, spaced apart from each other, the spacing between said members supported and maintained by a plurality of transverse members, one of each said transverse members attached to each end of said plurality of horizontal longitudinal members, wherein said plurality of longitudinal members includes a top longitudinal member and a bottom longitudinal member, said bottom member being longer than said top member.

4. A pet barrier as recited in claim 3, wherein said panel is an open trapezoidal grating formed from three horizontal longitudinal members, a top longitudinal member, a middle longitudinal member and a bottom longitudinal member, all spaced apart from each other, the spacing between said members maintained by two transverse members, one of each said transverse members attached to each end of said horizontal longitudinal members.

5. A pet barrier as recited in claim 3, wherein said panel is formed from a material selected from a group consisting of polycarbonates, plexiglass, and plastics.

6. A pet barrier as recited in claim 3, wherein said panel is formed from a material selected from a group consisting of wood, non-ferrous metal, and ferrous metal.

7. A pet barrier as recited in claim 3, wherein said means for guiding, aligning and positioning said engagement bolts comprises a plurality of panel engagement guides formed within said panel and extending in a vertical plane from the top surface of said top longitudinal member through said panel to the bottom surface of said bottom longitudinal member, said engagement guides providing concentric alignment with at least two vehicle headrest sockets atop the backrest of the seating arrangement, allowing alignment for urging said bolts engagably into the headrest sockets.

8. A pet barrier as recited in claim 3, wherein said means for guiding and positioning said bolts comprises a plurality of apertures formed as sleeves, said sleeves positioned in each of said longitudinal members, said apertures providing concentric frictional alignment for urging said bolts engagably into the headrest sockets.

9. A pet barrier as recited in claim 7, wherein said engagement guides are apertures molded within said panel, said apertures selected from a group consisting of all round apertures, all slot apertures, and a combination of round and slot apertures.

10. A pet barrier as recited in claim 2, wherein said panel is formed from a single sheet of material selected from a group consisting of optically transmissive high impact polycarbonates and bullet proof glass, for providing maximum protection from pets which may be capable of activities dangerous to other occupants of the vehicle, said panel including at least one orifice allowing ventilation through said panel.

11. A pet barrier for an automobile having removable headrests, said barrier comprising:

a panel forming a barrier for preventing a pet initially placed in a desired, first location of the vehicle from subsequently entering a prohibited, second location of the vehicle by moving over and across the top of a seating arrangement, wherein the seating arrangement has a plurality of headrest assemblies, each assembly including a removable headrest and at least one headrest socket remaining in the seating arrangement after removal of headrests, wherein said panel includes a plurality of horizontal, longitudinal structural members, including a top horizontal, longitudinal structural member and a bottom horizontal, longitudinal structural member, said panel further including at least one transverse structural member, said transverse member connected to each said longitudinal member, supporting and maintaining a fixed, parallel spacing between and among said longitudinal members;

a plurality of slidable, engagement bolts for frictional engagement with said panel and vehicle headrest sockets for affixing said panel atop the backrest of a seating arrangement having a plurality of removable headrests, for providing a pet barrier in an automobile; and a plurality of panel engagement guides formed within each said horizontal, longitudinal structural member of said panel and extending in a vertical plane from the top surface of said top longitudinal member through each said longitudinal member to the bottom surface of said bottom longitudinal member, said engagement guides providing concentric alignment with at least two vehicle headrest sockets atop the backrest of the seating arrangement, for guiding, aligning and positioning said engagement bolts, such alignment facilitating urging thereupon said bolts into headrest sockets remaining after headrests have been removed, for positioning said panel vertically atop the seating arrangement.

12. A pet barrier as recited in claim 11, wherein said panel is formed from a material selected from the group consisting of polycarbonates, plexiglass, and plastics.

13. A pet barrier, as recited in claim 12, wherein said panel engagement guides are apertures formed within said plurality of longitudinal members of said panel, said apertures selected from a group consisting of all round apertures, all slot apertures, and a combination of round and slot apertures.

14. A pet barrier, as recited in claim 13, wherein said panel is formed as a trapezoid grating, said bottom longitudinal member longer in length than said top longitudinal member.

15. A pet barrier, as recited in claim 14, wherein said engagement bolts are formed from a material selected from a group consisting of ferrous metals, non-ferrous metals, polycarbonates, and plastics.

\* \* \* \* \*